(12) United States Patent
Blatz

(10) Patent No.: US 7,736,217 B2
(45) Date of Patent: Jun. 15, 2010

(54) HAND-HELD POWER TOOL WITH PROTECTION HOOD

(75) Inventor: Thomas Blatz, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/818,002

(22) Filed: Jun. 12, 2007

(65) Prior Publication Data

US 2007/0298696 A1  Dec. 27, 2007

(30) Foreign Application Priority Data

Jun. 13, 2006  (DE) .................. 10 2006 000 294

(51) Int. Cl.
*B24B 55/05* (2006.01)
(52) U.S. Cl. .................... 451/454; 451/451
(58) Field of Classification Search ............ 451/454, 451/452, 451, 359, 358, 344
See application file for complete search history.

(56) References Cited

U.S. PATENT DOCUMENTS

| 1,393,811 | A | * | 10/1921 | Mossholder et al. | .......... 24/271 |
|---|---|---|---|---|---|
| D335,079 | S | * | 4/1993 | Sachs | .......... D8/396 |
| 6,688,955 | B2 | * | 2/2004 | Ruey-Zon | .......... 451/360 |
| 6,988,939 | B2 | * | 1/2006 | Hofmann et al. | .......... 451/344 |
| D537,692 | S | * | 3/2007 | Aglassinger | .......... D8/70 |
| 7,311,589 | B2 | * | 12/2007 | Wiker | .......... 451/451 |

\* cited by examiner

*Primary Examiner*—Robert Rose
(74) *Attorney, Agent, or Firm*—Abelman, Frayne & Schwab

(57) ABSTRACT

A hand-held power tool for rotating a working tool disc (30) includes a removable protection hood (6) for partially covering the working tool disc (30) during operation, and a clamping device (8) for securing the protection hood (6) relative to a power tool head (2) and having a clamping member (12) that limits partially a substantially cylindrical region (14) for receiving an attachment collar, and a clamping element (20) provided at opposite ends (19) of the clamping member (12) for displacing the clamping device (8) into its locking position and having a locking region (34) projecting into the receiving region (14) of the clamping member (12) at least in the locking position of the clamping device (8).

4 Claims, 5 Drawing Sheets

HAND-HELD POWER TOOL WITH PROTECTION HOOD

BACKGROUND OF THE INVENTION

1. Field of the Invention

The present invention relates to a hand-held power tool for rotating a working tool disc, in particular to a slitting or grinding disc, and including a removable protection hood for partially covering the working tool disc during operation, and a clamping device for securing the protection hood relative to a power tool head and having a clamping member that limits partially a substantially cylindrical region for receiving an attachment collar, and clamping means provided at opposite ends of the clamping member for displacing the clamping device into a locking position in which the size of the receiving region is reduced in comparison with the size of the receiving region in a release position of the clamping device.

2. Description of the Prior Art

In hand-held power tools of the type discussed above, the protection hood can be secured in a predetermined pivotal position with a clamping device. By displacement of the clamping device from the locking position to the release position, the position of the protection hood relative to the remaining portion of the power tool can be adjusted or the protection hood can be removed completely.

German Patent Publication DE 198 34 839 A1 discloses a grinding machine with a removable or detachable protection hood having a clamping ring that can be placed on a spindle collar of the grinding machine. On the hood, there is provided a locking lug that projects radially inwardly beyond the clamping ring. The locking lug engages in a groove-shaped recess provided on the spindle collar and axially secures the protection hood on the spindle collar.

The drawback of the power tool disclosed in DE 198 34 839 A1 consists in that the provision of the locking lug is associated with relatively high additional manufacturing costs. In addition, the locking lug can easily be tilted during adjustment, mounting, or removal of the protection hood, which makes a respective process noticeably more difficult.

Accordingly, an object of the present invention is to provide a power tool in which the aforementioned drawbacks of the known power tool are eliminated and additional manufacturing costs are minimized.

Another object of the present invention is to provide a hand-held power tool with a protection hood in which a reliable axial mounting of the protection hood on the power tool is ensured.

SUMMARY OF THE INVENTION

These and other objects of the present invention, which will become apparent hereinafter, are achieved by providing, in the clamping device, clamping means having a locking region projecting into the receiving region of the clamping member at least in the locking position of the clamping device.

The provision of the locking region insures that the clamping device in addition to a frictional connection of the clamping member with the attachment collar which results from tightening of the clamping member, provides a formlocking connection acting in the axial direction.

In a particularly advantageous embodiment of the inventive power tool, with the mounted projection hood, the locking region engages in an annular groove in the attachment collar. Thereby, a single additional element necessary for axially securing the protection hood, is formed by an economically produced annular groove.

Advantageously, the attachment collar is formed by a power tool neck, and the clamping device is fixedly secured with the protection hood. Thereby, the clamping device is reliably held on the protection hood and is handled together with the protection hood. When the power tool is handled without the protection hood, no elements of the clamping device, which can cause tilting or other obstacles are located thereon.

Advantageously, the locking region is formed by a point-shaped metal element. Thereby, tilting during the adjustment, removal, or attachment of the protection hood can be prevented. On the other hand, such a rigid locking region ensures an exact and stable positioning of the protection hood relative to the remaining power tool.

Advantageously, the clamping means is formed by lever means displaceable between the locking and release positions of the clamping device without use of any tool. This provides for a rapid displacement of the clamping device between the locking and release positions and, thereby, a comfortable adjustment, release, and mounting of the protection hood.

Advantageously, the lever means has an eccentric and an actuation lever for adjusting a position of the eccentric, and the clamping device further includes a rotation-preventing member that is actuated by the actuation lever and that engages, in the locking position of the clamping device, a rotation-preventing receptacle provided on the power tool. Thereby, simultaneously with an axial fixing of the protection hood, the protection hood is secured against rotation or is released. This also ensures a particular stable positioning of the protection hood relative to the remaining part of the power tool, whereby the protection hood can be easily and quickly secured, adjusted, or removed. It is advantageous when the rotation-preventing member is formed by a spring lug connected with the protection hood for joint rotation therewith, and the rotation-preventing receptacle is formed by a recess provided on a power tool neck. The actuation lever has a cam formed thereon for reliably retaining the spring lug in engagement with the rotation-preventing receptacle. Thereby, in the release position of the clamping device, the spring lug can be easily displaced from one rotation-preventing receptacle into another upon application of a predetermined torque. With this locking function of the spring lug, several pivotal positions of the protection hood can be predetermined and exactly defined in the release position of the clamping device. Likewise, a set pivotal position can be stably secured in the locking position of the clamping device, without any tilting.

Alternatively, the rotation-preventing member is formed by a hook provided on the actuation lever, and the rotation-preventing receptacle is formed by a hook-shaped recess provided on the power tool neck. This ensures a particularly stable fixing against rotation.

In a particularly advantageous embodiment of the inventive power tool, an intermediate sleeve is provided between the clamping member and the power tool neck. The intermediate sleeve at least partially prevents contact between the clamping member and the power tool neck. Thereby, seizure or cold welding between these two elements, which, e.g., are formed of aluminum or magnesium, is prevented.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
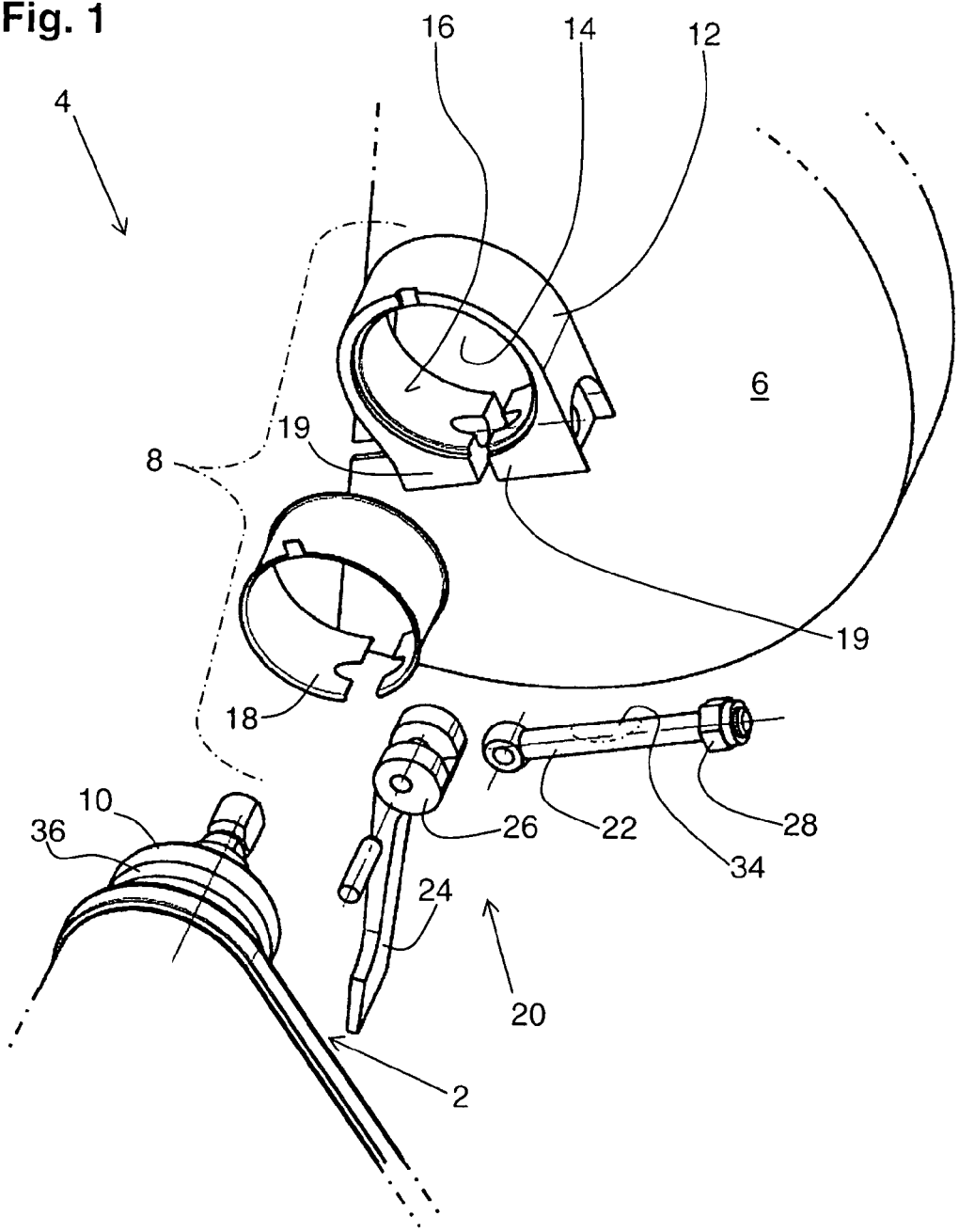
FIG. 1 an exploded perspective view of a tool head of a hand-held power tool according to the present invention.

FIG. 1 shows a tool head 2 of a hand-held power tool 4 according to the present invention which can be formed as an electrical slitting or grinding power tool. On the tool head 2, there is provided a protection hood 6 that can be secured on an attachment collar, which is formed by a tool neck 10, with a releasable clamping device 8. The clamping device 8 is fixedly connected with the protection hood 6. Alternatively, the clamping device 8 can be provided on the tool neck 2 and the attachment collar can be provided on the protection hood 6.

The clamping device 8 has an essentially strip-shaped clamping member 12 which is fixedly connected with the protection hood 6 and which is arranged in a loop-shaped manner, defining thereby a substantially cylindrical receiving region 14 for receiving the tool neck 10. On the inner side 16 of the clamping member 12, there is provided an open intermediate sleeve 18 that prevents a direct contact between the tool neck 10 and the clamping member 12 in the mounted condition of the protection hood 6. This prevents seizure, e.g., cold welding of the clamping member 12 with the tool neck 10 that can be formed, e.g., of aluminum or magnesium. The intermediate sleeve 18 itself can be formed of metal.

The clamping device 8 further includes clamping means 20 in the form of a release lever element that includes a pin-shaped tension member 22 and an actuation lever 24 connected with the tension member 22. The tension member 22 and the actuation lever 24 are arranged at opposite ends 19 of the clamping member 12. On the actuation lever 24, there is formed an eccentric 26 that engages a respective end 19 of the clamping member 12, whereas the head 28 of the tension member 22 engages another of the ends 19. Alternatively, instead of a release lever element, a screw or a threaded bolt can form the clamping means 20 which, as a rule, can be set between a locking position and a release position only by using a special tool.

Figure 2:
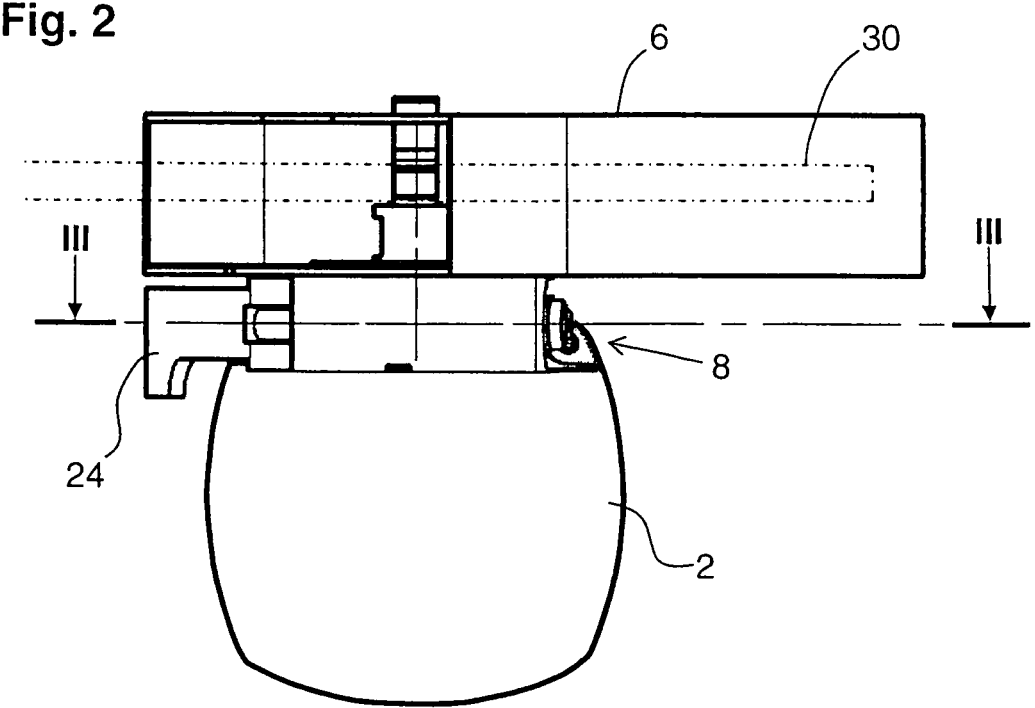
FIG. 2 a plan view of the tool head shown in FIG. 1 with a mounted protection hood.

As shown in FIG. 2, the protection hood 6 serves, in its mounted condition, for partially covering a working disc 30 that can be formed, e.g., as a slitting or grinding disc. In the locking position of the clamping device 8, the actuation lever 24 is located adjacent to the tool head 2.

Figure 3:
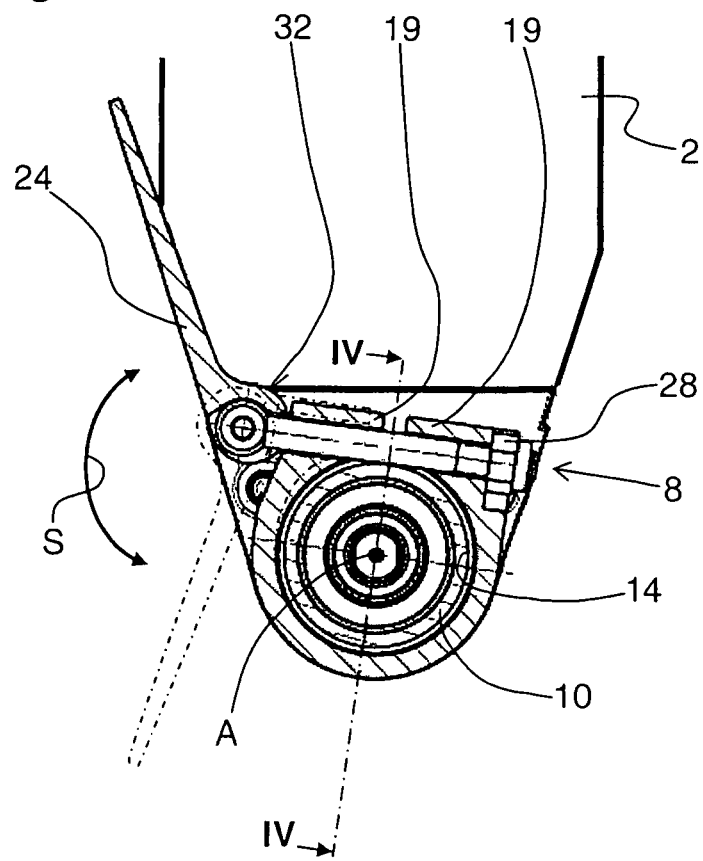
FIG. 3 a cross-sectional view of the tool head along line III-III in FIG. 2.

As shown in FIG. 3, by pivoting the actuation lever 24 in a pivot direction S, the clamping device 8 can be displaced from the locking position into the release position, which is shown with dot-dash lines without using any tool. Thereby, the distance between the eccentric outer surface 32 and the head 28 of the tension member 22 increases, whereby the end 19, which is engaged by the eccentric 26, moves away from the end 19 which is engaged by the head 28 of the tension member 22. Thereby, the receiving region 14, which is limited by the clamping member 12, is increased, and the clamping device 8, together with the protection hood 6, can be pivoted about the working tool axis A into a new pivotal position with respect to the tool head 2.

In its new position, the protection hood 6 can be secured again by a pivotal movement of the actuation lever 24 along the pivot direction S, again without use of any special tool. Thereby, the receiving region 14 becomes reduced, with the clamping device 8 being fixedly mounted on the tool neck 10.

Figure 4:
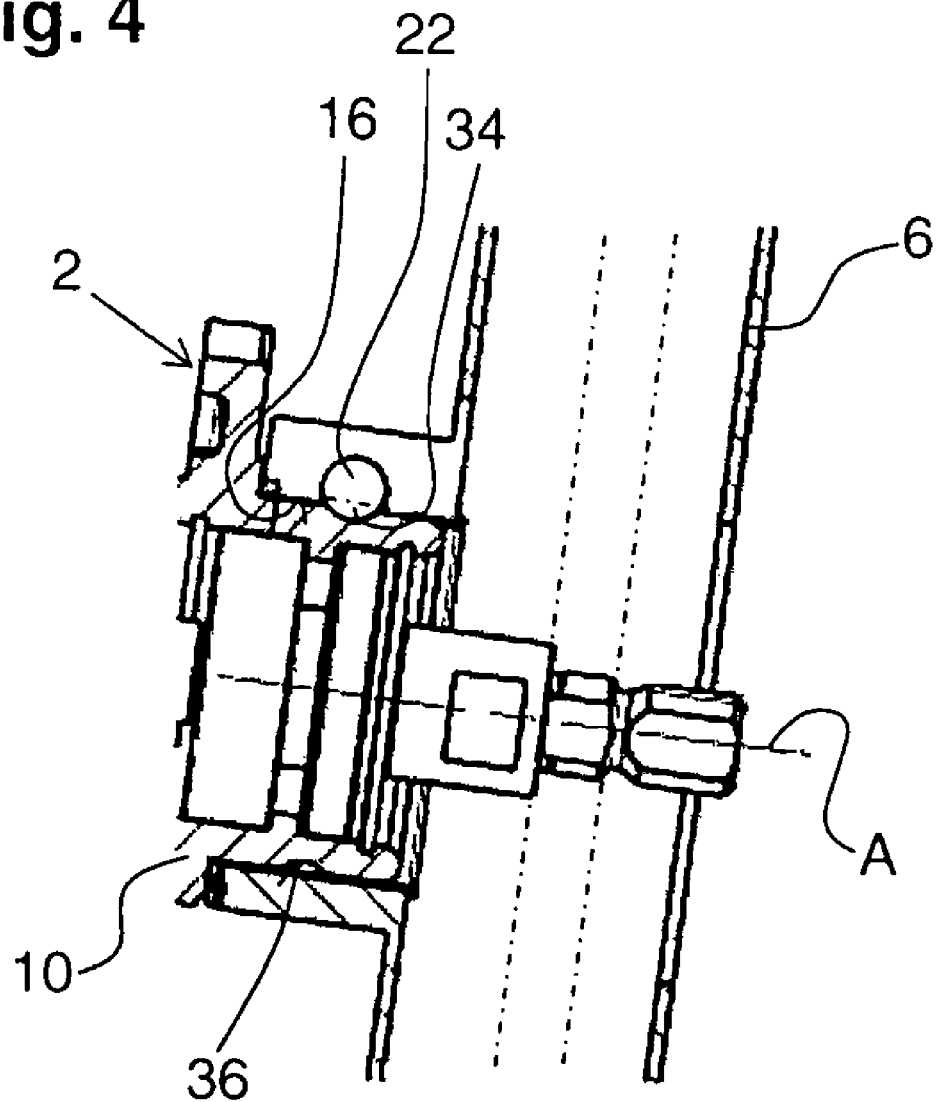
FIG. 4 a cross-sectional view of the tool head along line IV-IV in FIG. 3.

As particularly shown in FIG. 4, the tension member 22, which is formed of metal, has a locking region 34 that projects, at least in the locking position of the clamping device 8, radially inward beyond the inner side 16, engaging in annular groove 36 of the tool neck 2. This engagement prevents displacement of the protection hood 6 relative to the tool neck 10 in a direction of the axis A and, thereby, insures the axial position of the protection hood 6 relative to the tool neck 10. The fixed axial position of the protection hood 6 relative to the tool neck 10 enables the pivotal movement of the protection hood 6 into a new pivotal position relative to the tool neck 10, without the protection hood 6 side slipping from the tool neck 10. There can be provided a pivotal position in which the locking region 34 is aligned with a flattening of the tool neck 10 (not shown) which opens the groove 36 in the axial direction, so that in this pivotal position, lifting of the protection hood 6 off the tool neck 10 becomes possible. Alternatively, the clamping device 8 can be so formed that the locking region 34 becomes disengaged from the groove 36 in the release position of the clamping device 8.

Figure 5:
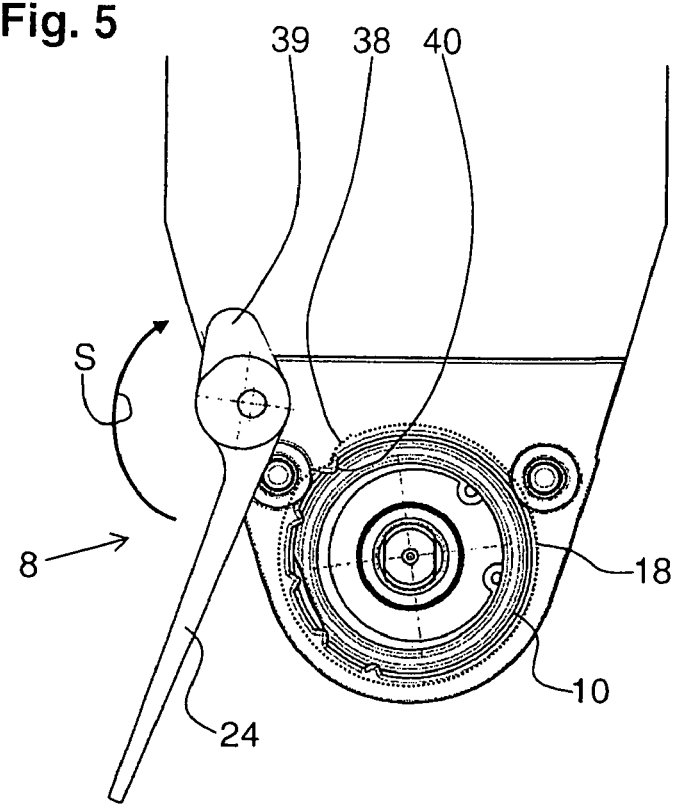
FIG. 5 a side view of the tool head with an alternative clamping device in a release position.
Figure 6:
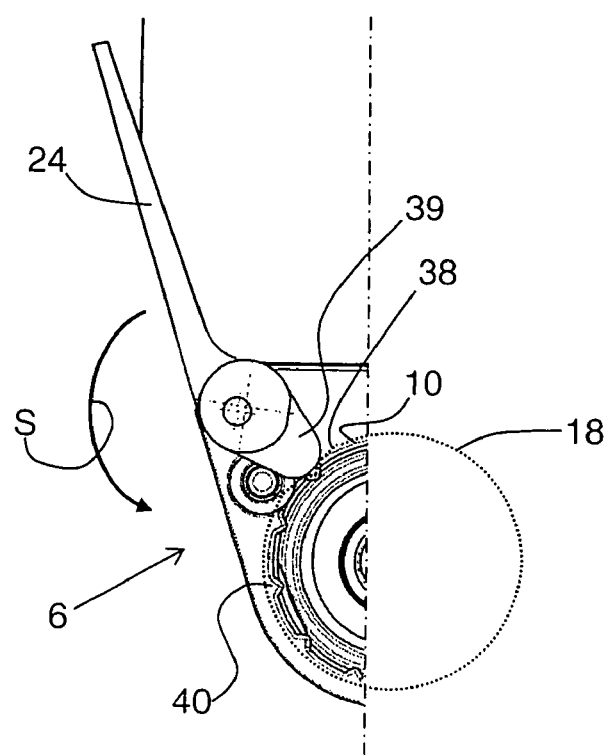
FIG. 6 a view similar to that of FIG. 5 but with the clamping device in a locking position.

FIGS. 5 and 6 show an alternative embodiment of the clamping device 8. In this embodiment, a rotation-preventing member 38 in the form of a spring lug is provided on the intermediate sleeve 18, shown with a dotted line, which is connected with the clamping member 12 (not shown here) for joint rotation therewith. In the release position, the spring lug engages in one of several rotation-preventing receptacles 40 in the form of recesses provided on the tool neck 10. An obtained lock can be lifted by application of a predetermined torque to the protection hood 6 in order to displace the rotation-preventing member 38 in another pivotal position in which the spring lug 38 engages another rotation-preventing receptacle 40.

In order to ensure the engagement of the rotation-preventing member 38 in a certain rotation-preventing receptacle 40 and, thereby, to fix the predetermined pivotal position of the protection hood 6 relative to the tool neck 10, a safety cam 39 is formed on the actuation lever 24. In the locking position, the safety cam 39 presses the rotation-preventing member 38 against the tool neck 10, ensuring the engagement of the rotation-preventing member 38 and the corresponding rotation-preventing receptacle 40. Thereby, the protection hood 6 is secured particularly stably against rotation in its predetermined pivotal position relative to the tool head 2. Upon a pivotal movement of the actuation lever 24 along the pivot direction S to its release position, simultaneously, the engagement between the rotation-preventing member 38 and the rotation-preventing receptacle 40 is lifted, and the protection hood 6 can be displaced and secured in a new pivotal position by application of a predetermined torque.

Alternatively to the shown embodiment, a direct engagement between the safety cam 39 and a correspondingly formed rotation-preventing receptacle 40 can be provided for, without use of the intermediate rotation preventing member 38.

Figure 7:
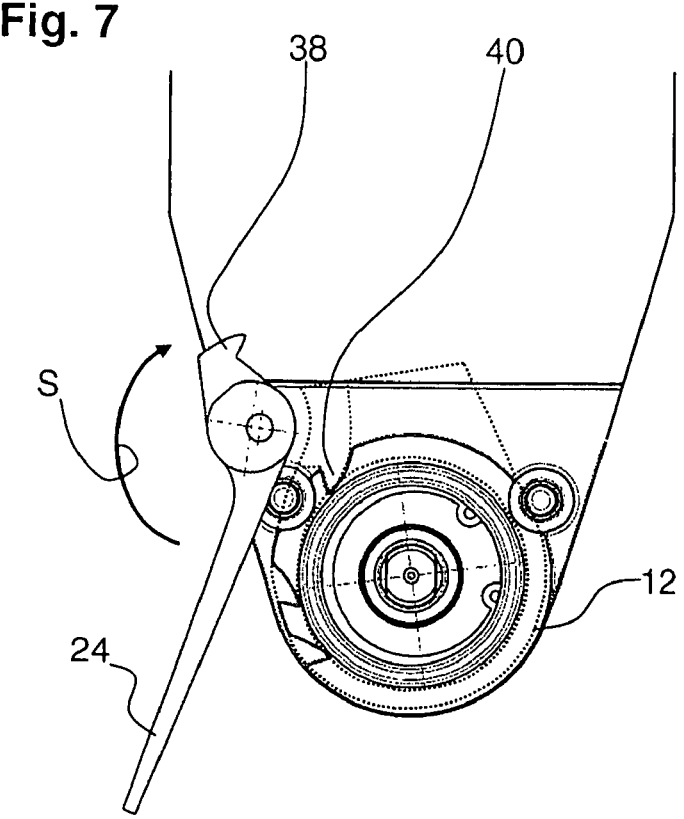
FIG. 7 a view similar to that of FIG. 5 but with a clamping device according to a further embodiment in a release position of the clamping device.
Figure 8:
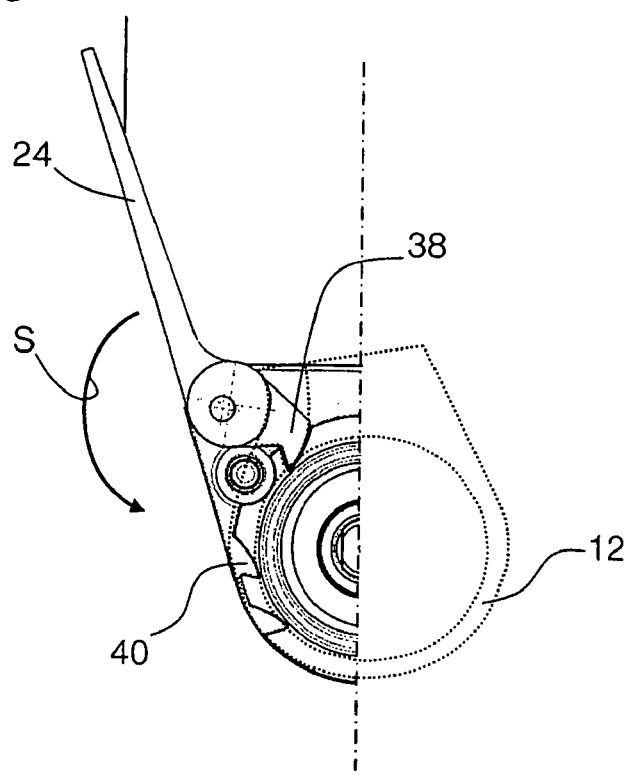
FIG. 8 a view similar to that of FIG. 7 but with the clamping device in the locking position.

FIGS. 7-8 show a further alternative embodiment of the clamping device 8 and which is based on the same principle as the clamping device shown in FIGS. 5-6. In the embodiment of FIGS. 7-8, the rotation-preventing member 38, which is formed on the actuation lever 24, is hook-shaped and cooperates, in the locking position of the actuation lever 24, with a respective one of a plurality of rotation-preventing receptacles 40 which are formed on the tool neck 10 and are likewise hook-shaped. In the locking position, the hook-shaped rotation-preventing member 38 also engages in a correspondingly hook-shaped safety recess 42 on the clamping member 12. In this way, the clamping member 12 is secured to the tool neck 10 by the rotation-preventing member 38. Thereby, the protection head 6 is held against rotation, in a respective pivotal position, relative to the tool head 2.

Though the present invention was shown and described with references to the preferred embodiments such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A hand-held power tool for rotating a working tool disc (30), comprising: a removable protection hood (6) for partially covering the working tool disc (30) during operation; and a clamping device (8) for securing the protection hood (6) relative to a power tool head (2), the clamping device (8) including a clamping member (12) that limits partially a substantially cylindrical receiving region (14) for receiving an attachment collar, and clamping means (20) provided at opposite ends (19) of the clamping member (12) for displacing the clamping device (8) in a locking position thereof in which the receiving region (14) is reduced in comparison with a release position of the clamping device (8), the clamping means (20) having a locking region (34) projecting into the receiving region (14) at least in the locking position of the clamping device (8), wherein with the mounted protection hood (6), the locking region (34) engages in an annular groove (36) in the attachment collar.

2. A hand-held power tool for rotating a working tool disc (30), comprising: a removable protection hood (6) for partially covering the working tool disc (30) during operation; and a clamping device (8) for securing the protection hood (6) relative to a power tool head (2), the clamping device (8) including a clamping member (12) that limits partially a substantially cylindrical receiving region (14) for receiving an attachment collar, and clamping means (20) provided at opposite ends (19) of the clamping member (12) for displacing the clamping device (8) in a locking position thereof in which the receiving region (14) is reduced in comparison with a release position of the clamping device (8), the clamping means (20) having a locking region (34) projecting into the receiving region (14) at least in the locking position of the clamping device (8), wherein the clamping means (20) is formed by lever means displaceable between the locking and release positions of the clamping device (8) without use of any tool, wherein the lever means comprises an eccentric (26) and an actuation lever (24) for adjusting a position of the eccentric (26), and wherein the clamping device (8) further includes a rotation-preventing member (38) that is actuated by the actuation lever (24) and that engages, in the locking position of the clamping device (8), a rotation-preventing receptacle (40) provided on the power tool, wherein the rotation-preventing member (38) is formed by a spring lug connected with the protection hood (6) for joint rotation therewith, and the rotation-preventing receptacle (40) is formed by a recess provided on a power tool neck (10), and wherein the actuation lever (24) has a cam (39) formed thereon for reliably retain the spring lug (38) in engagement with the rotation preventing receptacle (40).

3. A hand-held power tool according to claim 1, wherein the attachment collar is formed by a power tool neck (10), and the clamping device (8) is fixedly secured with the protection hood (6).

4. A hand-held power tool for rotating a working tool disc (30), comprising: a removable protection hood (6) for partially covering the working tool disc (30) during operation; and a clamping device (8) for securing the protection hood (6) relative to a power tool head (2), the clamping device (8) including a clamping member (12) that limits partially a substantially cylindrical receiving region (14) for receiving an attachment collar, and clamping means (20) provided at opposite ends (19) of the clamping member (12) for displacing the clamping device (8) in a locking position thereof in which the receiving region (14) is reduced in comparison with a release position of the clamping device (8), the clamping means (20) having a locking region (34) projecting into the receiving region (14) at least in the locking position of the clamping device (8), wherein the clamping means (20) is formed by lever means displaceable between the locking and release positions of the clamping device (8) without use of any tool, wherein the lever means comprises an eccentric (26) and an actuation lever (24) for adjusting a position of the eccentric (26), and wherein the clamping device (8) further includes a rotation-preventing member (38) that is actuated by the actuation lever (24) and that engages, in the locking position of the clamping device (8), a rotation-preventing receptacle (40) provided on the power tool, wherein the rotation-preventing member (38) is formed by a hook provided on the actuation lever (24), and the rotation-preventing receptacle (40) is formed by a hook-shaped recess provided on the power tool neck (10).

\* \* \* \* \*